Aug. 3, 1948. H. B. CLIBBON 2,446,361
MOISTURE VAPOR INDICATOR FOR PACKAGED GOODS
Filed July 9, 1945

INVENTOR.
Herbert B. Clibbon.
BY
Harness, Dickey & Pierce.
ATTORNEYS.

Patented Aug. 3, 1948

2,446,361

UNITED STATES PATENT OFFICE 2,446,361

MOISTURE VAPOR INDICATOR FOR PACKAGED GOODS

Herbert B. Clibbon, Detroit, Mich.

Application July 9, 1945, Serial No. 603,968

5 Claims. (Cl. 312—31.1)

The invention relates to moisture vapor indicators for packaged goods.

Before aircraft engines or other goods that rust or are otherwise damaged by exposure to moisture are shipped overseas or transported in humid climates, they are wrapped individually in a moisture impervious material. On long shipments the goods must be inspected regularly to determine whether any moisture has penetrated the wrapping. If moisture is found inside the protective envelope the goods must be thoroughly dried and re-wrapped. As a precautionary measure and to expedite inspection of the goods it has become conventional practice to place a perforated, transparent receptacle containing a suitable moisture indicator and absorbent such as cobalt silica gel inside the wrapping. The cobalt silica gel absorbs any moisture that penetrates the wrapping and visibly reveals the presence of moisture by a change in color. In the case of aircraft engines or the like, the receptacle is usually held in a prominent position and prevented from moving about inside the wrapping by providing it with a threaded neck and screwing the latter into a spark plug opening.

It obviously is necessary that the goods be inspected without removing the protective envelope. Transparent wrapping materials such as Cellophane have, therefore, been widely used. However, none of these materials have proved entirely satisfactory since in general they are not completely impervious to moisture and it is difficult to seal the edges of the wrapping with glue or other adhesive so that the joints or seams do not open or pull apart under the abuse of handling and shipment. Opaque wrapping materials such as cloth or heavy paper lined with metallic foil have also been extensively used and while these materials are superior to the transparent materials in the above respects, they have the disadvantage that it is more difficult to inspect the goods and that a window must be provided through which the receptacle can be seen. The window usually comprises an opening in the wrapping covered by a piece of Cellophane or the like. The Cellophane is merely placed over the opening and held in place by a suitable adhesive. However, the same difficulty has been experienced as with the transparent wrappings; viz., it is difficult to obtain a satisfactory bond between the transparent material and the wrapping material that will withstand the rough treatment which the goods receives during handling and shipment.

The problem is further aggravated by the fact that simple and inexpensive procedures must be adhered to since the wrappings are usually used only once and then discarded.

According to the instant invention the receptacle is attached directly to the wrapping instead of to the goods, In this position the receptacle is easily visible outside the package and, since it is made of rigid material, it can be mechanically clamped to the flexible or pliable wrapping material to assure a moisture tight joint therebetween. The wrapping material may be either transparent or opaque, although the latter is preferred due to its greater imperviousness to moisture and the relative ease with which its edges can be sealed to withstand handling and shipment. When the wrapping has been applied to the goods the receptacle communicates with the interior of the envelope thus formed to absorb any moisture that may gain access therein and to indicate the presence of such moisture by a change in color.

In the drawings forming a part of this specification and wherein like numerals are used to designate like parts throughout the same:

Figure 1:
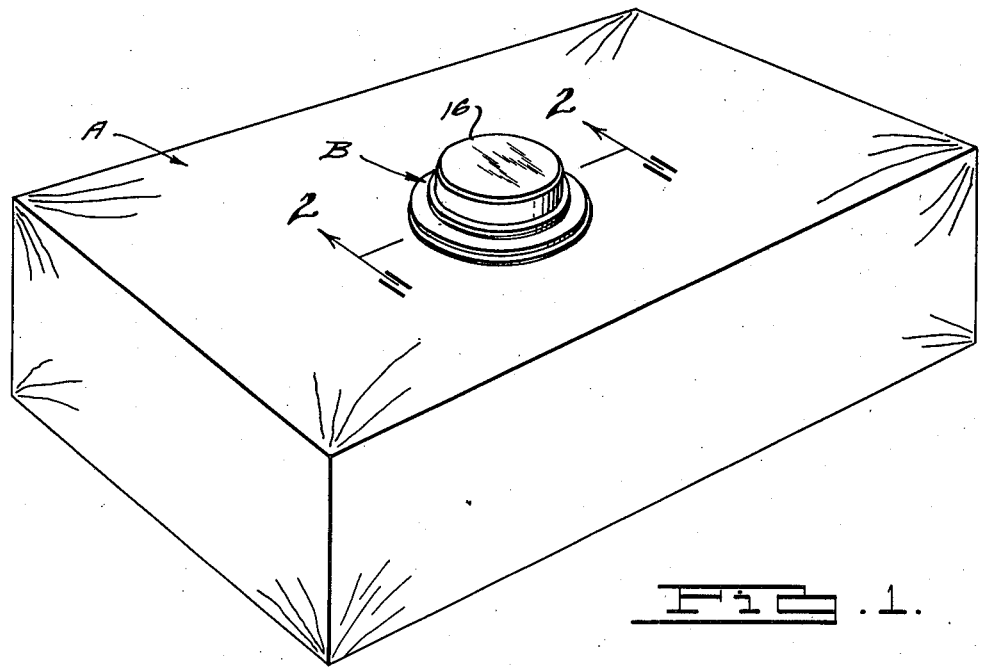
Figure 1 is a perspective view of a package embodying the invention.

Attention is first directed to Figure 1 which shows a package or envelope comprising wrapping material A and a receptacle B. The latter preferably is mounted in an opening formed substantially centrally of the wrapping material so that it will be positioned at approximately the top of the package when such material is wrapped around the goods.

The wrapping material A here shown is formed from a suitable fabric 10 which is lined with metallic foil 12. The receptacle B includes a container for the moisture absorbent and indicator C. The container which is transparent and may conveniently be formed from suitable plastic materials such as synthetic resins, includes a cylindrical wall 14, a closed top 16, and a perforated bottom 18. If the container is made of thermo-plastic material the bottom 18 may be formed separately and secured to the wall 14 by application of heat after the moisture absorbent and indicator material is placed therein.

Figure 2:
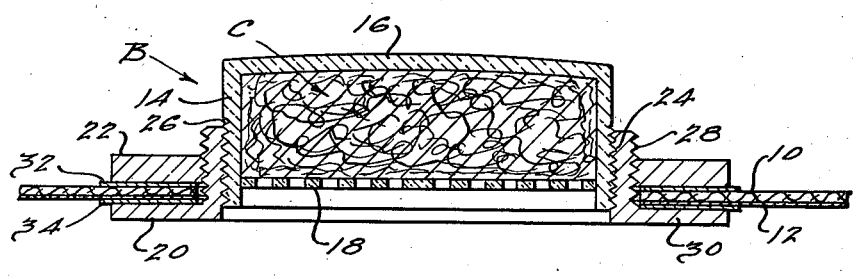
Figure 2 is a fragmentary, vertical sectional view taken on the line 2—2 of Figure 1 and showing the manner in which the receptacle is attached to the wrapping material.

A collar 20 and locking ring 22 form a coupling which supports the container in the opening as best shown in Figure 2. The collar 20 is formed with internal threads 24 and external threads 28, the former being engaged by external threads 26 on the lower portion of the container wall 14 and the latter being engaged by the internally threaded locking ring 22. A radial flange 30 on the collar extends under the material A around the opening and co-operates with the locking ring 22 to clamp the material therebetween. Gaskets 32 and 34 are positioned between locking ring 22 and flange 30 and at opposite sides of the material to assure sealed joints therebetween. It is also desirable that the external threads 28 be coated with a suitable sealing compound before the container is screwed into the collar 20 to assure a moisture tight joint between the container and the collar.

When wrapping the goods material A is placed thereon with the receptacle B disposed to be clearly visible when the wrapping operation is completed. The material is then wrapped about the goods and sealed in the conventional manner to form a moisture-impervious envelope. The clamping action of locking ring 22 and flange 30 prevents the material from pulling away from the receptacle and assures a moisture tight joint therebetween that will withstand the ordinary abuse which the goods receives during shipment.

While the container is here shown projecting substantially above the collar 20, it may be positioned lower in the collar if desired. Although the container is more easily visible for inspection when mounted in the manner shown it may be necessary to position it lower in the collar if the goods are to receive rough treatment.

Figure 3:
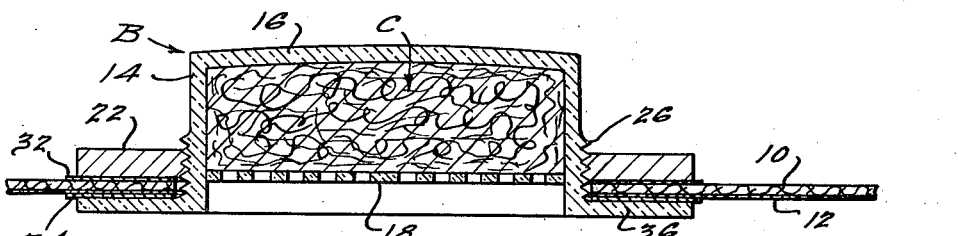
Figure 3 is a view similar to Figure 2 but showing a modified form of receptacle.

In Figure 3 is shown a modification of the receptacle. This form of the invention is identical to the form hereinabove described except that the collar 20 is eliminated and the cylindrical wall 14 of the container is extended below the bottom 18 and formed with a radial flange 36 which extends under the material around the opening and co-operates with the locking ring 22 to clamp the material therebetween. In this adaptation of the invention, the internal threads of locking ring 22 engage directly with the external threads 26 on wall 14. It will be observed that the threaded portion of the wall is slightly larger in diameter than the upper portion thereof so that locking ring 22 can be brought easily into engagement with the threads 26.

It is to be understood that the forms of the invention herewith shown and described are to be taken as preferred examples of the same and that various changes in the size, shape, and arrangement of parts may be resorted to without departing from the spirit of the invention or the scope of the appended claims.

What is claimed is:

1. A covering for packaged goods comprising an envelope of flexible wrapping material formed with an opening; a transparent container disposed in said opening and communicating with the interior of the envelope; moisture absorbent and indicator means in the container; a rigid coupling carried by the container clamped to the material around the opening; and sealing means between the coupling and said material.

2. A covering for packaged goods comprising an envelope of flexible wrapping material formed with an opening; a transparent container disposed in said opening and communicating with the interior of the envelope; a collar carried by the container having a radial flange extending under the material around the opening; moisture absorbent and indicator means in the container; and a locking ring on the collar above the material co-operating with the flange to clamp said material therebetween.

3. A covering for packaged goods comprising an envelope of flexible wrapping material formed with an opening; a transparent container having an externally screw threaded lower end and a perforated bottom; a collar surrounding the container and threadedly connected thereto, said collar being externally threaded and having a radial flange extending under the material around the opening; and a locking ring threadedly engaging the external threads of the collar and co-acting with said radial flange to clamp the material therebetween.

4. A covering for packaged goods comprising an envelope of flexible wrapping material formed with an opening; a transparent container disposed in said opening and communicating with the interior of the envelope, said container formed with external threads and having a radial flange extending under the material around the opening; moisture absorbent and indicator means in the container; and a locking ring threadedly engaging said external screw threads and co-acting with the flange to clamp the material therebetween.

5. A covering for packaged goods comprising an envelope of flexible wrapping material formed with an opening; a transparent container disposed in said opening and communicating with the interior of the envelope; moisture absorbent and indicator means in the container; and means attaching the container to the material around the opening, said means having a sealed engagement with the material to form a moisture tight joint therebetween.

HERBERT B. CLIBBON.

REFERENCES CITED

The following references are of record in the file of this patent:

UNITED STATES PATENTS

| Number | Name | Date |
| --- | --- | --- |
| 1,222,656 | Moyer | Apr. 17, 1917 |
| 2,278,198 | Hall | Mar. 31, 1942 |
| 2,322,213 | Amberg | June 22, 1943 |

FOREIGN PATENTS

| Number | Country | Date |
| --- | --- | --- |
| 437,139 | Great Britain | Oct. 1935 |